Patented Nov. 18, 1930

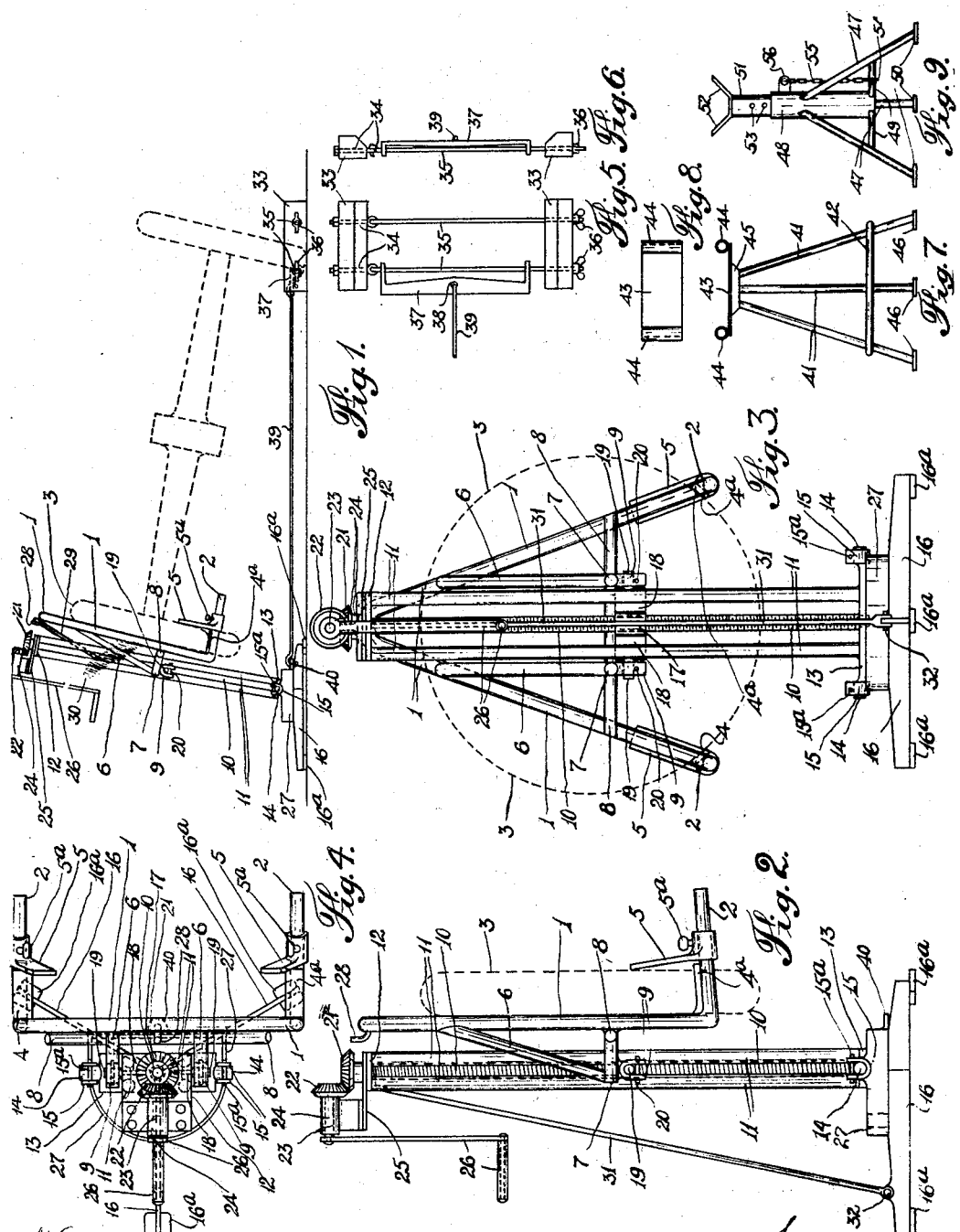

1,782,306

UNITED STATES PATENT OFFICE

JOSEPH ADOLPH GEORGE KIRSTEN, OF EAST LONDON, SOUTH AFRICA

MEANS OR APPARATUS FOR LIFTING MOTOR VEHICLES AND THE LIKE THROUGH THE MEDIUM OF THEIR WHEELS

Application filed May 9, 1928, Serial No. 276,386, and in the Union of South Africa May 20, 1927.

This invention relates to a means or apparatus designed for lifting motor cars and other similar mechanically propelled vehicles by or through the medium of their wheels.

The invention can be employed for lifting or raising motor cars and other similar road vehicles at either side, or at either end, or bodily, that is at both sides and at both ends.

The object of the invention is to construct simple, durable, efficient and easily manipulated means or apparatus for the purpose specified, which can be used for lifting vehicles having wheels of different sizes, or irrespective of the size of their wheels.

Apparatus according to the invention affords, inter alia, the following features and advantages, viz.:—It is easily portable and, as far as the lifting apparatus proper is concerned, is self-contained; the lifting apparatus engages or has contact with the sides and peripheries of the wheels, thereby obviating the possibility of damage to or breakage of parts of the vehicle lying intermediate the wheels, and giving unrestricted access to the underside of the vehicle; and the arrangement is such that the entire lifting apparatus is kept and held down on the floor by the weight of the car or other vehicle, and the apparatus cannot slip or move outwardly during the lifting operation, or whilst the vehicle is being supported thereby, or lowered.

The apparatus includes what I may designate a cradle or portion which is adapted to be arranged in position against and under each wheel which is to be lifted, and a screw-jack or its equivalent which is combined and co-operates with the cradle to lift the vehicle. The jack is adapted to hinge or pivot about its lower end, or its base or support, and the cradle is in turn adapted to pivot about its point of attachment to the jack.

When the apparatus is being used for lifting vehicles at either side the jack will assume a gradually increasing inwardly inclined position from the bottom to the top in the direction of the cradle and the wheel, as the lifting of the vehicle is proceeded with.

In order to prevent the apparatus from slipping outwardly during the lifting operation, particularly when used for lifting vehicles at either side, and to insure that the apparatus shall be kept and held down firmly on the floor by the weight of the vehicle, means are provided which may conveniently be in the form of blocks of wood, which are connected together and placed on the floor at the front and back of the wheel at the opposite side of the vehicle to that from which the same is being lifted; the base of the jack being suitably coupled or connected to the said blocks. When used for lifting vehicles at either side means are preferably provided whereby the cradle and jack can be further coupled or connected together, as by a hook-shaped member loosely engaging with the top of the cradle at one end, and at its other and hook-shaped end engaging with the screw or other convenient part of the jack.

When the apparatus is to be used for raising the vehicle at both sides, at either or both ends, means are provided whereby the jacks and their bases can be additionally coupled or connected together, as by a stay, so as to form a more or less rigidly connected one-piece structure.

I prefer to construct the main framework of the cradle and jack or pipes or tubes and to weld all the joints, so that the whole of the stresses set up in the structure are borne or taken up by the pipes or tubular framework of the structure.

The invention will be more fully described with the aid of the accompanying drawings, which illustrate the use of the invention both for lifting a vehicle from the wheels at one side only, and for lifting the vehicle at both sides at either or both ends. In the drawings, Fig. 1 illustrates the apparatus being used for lifting a vehicle at one side, and incorporates the means which are adapted to be engaged by the wheel at the opposite side for keeping the vehicle in position and preventing the vehicle and apparatus from slipping.

Fig. 2 is a side elevation of the combined lifting jack and cradle shown in the position the parts will assume when lifting the vehicle at both sides of either end, or bodily.

Fig. 3 is a front elevation of Fig. 2.

Fig. 4 is a plan of Fig. 2.

Figs. 5 and 6 are plan and front elevation, respectively, of the means which are connected with the base of the jack and are engaged by the wheel of the vehicle at the opposite side of the jack, to prevent slipping.

Fig. 7 is an elevation of a suitable form of supporting stand, adapted to be placed under the wheel of the vehicle after the same has been lifted.

Fig. 8 is a plan of the wheel rest or upper portion of the stand shown in Fig. 7, and Fig. 9 is an elevation of another form of supporting stand adapted to be placed under the axle, chassis, running boards, et cetera, of the vehicle to support the same.

Referring more particularly to that embodiment of the invention illustrated in Figs. 1, 5 and 6 of the drawings, which arrangement is especially applicable for lifting a vehicle (portion of which is shown in dotted lines in Fig. 1) at one side thereof, the arrangement includes the cradle or that portion of the apparatus which is placed against the outside and under the periphery of the rim or tyre of the wheel. This cradle or portion, which may be principally made of iron or steel pipes or tubes, includes an inverted V-shaped portion or frame 1 which is placed against the outside of the wheel, with portions 2 which project transversely below the wheel 3, and to each of which is welded a plate or member 4, 4ª, on and between which part of the rim or tyre of the wheel 3 rests when the cradle is in position relative thereto. On the projecting portions 2 there are adjustably secured as by wing set screws 5ª, the stops or fences 5, which, as shown in Fig. 1, are adapted to be placed against the opposite side of the wheel 3 to the framework 1, and so ensure the retention of the wheel 3 in position in the cradle and prevent the latter from slipping outwards in the operation of lifting the vehicle. The cradle, as shown, also includes two parallel inclined tubes 6 welded at their upper ends to the inverted V-shaped portion or frame 1, and at their lower ends to tubular pieces 7 which, at their other ends, are welded to a cross tube 8 which is welded to the sides of the V-shaped framework 1.

To the underside of the tubular pieces 7, below the lower ends of the parallel inclined tubes 6 there are welded U-shaped pieces 9, which serve as bearings whereby the cradle is pivotally supported by the screw-jack.

The means whereby the cradle is raised and lowered, as before mentioned, is in the form of a screw-jack, including the screw 10, arranged in a frame comprising the four parallel pipes or tubes 11 which at their upper ends are welded to a plate 12 in which is provided a central hole which constitutes a guide bearing for the upper end of the screw 10. The lower ends of the tubes 11 are welded to a plate 13 constructed at the ends to form trunnions or pivots 14 whereby the jack is pivotally mounted in bearings 15 provided on the base 16; 15ª being retaining pins engaging in holes in the bearings 15 above the pivots 14. The plate 13 serves rotatably to support the lower end of the screw 10, in a hole in which plate 13 the reduced lower end of the screw is rotatably arranged.

On the screw 10 is mounted a nut 17 which is fashioned with lateral web or projections 18 which work or slide between the tubes 11, so that rotation of the nut 17 is prevented whilst it is free to be traversed up and down the screw 10. On the webs or projections 18 are formed trunnions or pivot pins 19 which serve to support the cradle through the medium of the bearings 9. 20 represent pins which are passed through the sides of the bearings 9 and serve for retaining the cradle in position on the trunnions or pivot pins 19.

On the upper end of the screw 10 is fixed a bevel toothed wheel 21. 22 is a bevel pinion which meshes with the wheel 21 and is fixed on one end of a spindle 23. The spindle 23 is supported in a bearing 24 which is fixed by plate 25 to the plate 12. 26 is a suitable crank handle for rotating the spindle 23 to rotate the screw through the medium of the bevel wheels 22, 21, in order to traverse the nut up and down said screw 10 to lift or lower the cradle.

The bearings 15 for the trunnions 14 are welded or otherwise suitably fixed on a curved or D-shaped frame or member 27 which forms the upper portion of the tripod or three-legged base, foundation or support 16 of the screw-jack. On the outer ends of the legs of the base 16, flat pieces 16ª may be welded to afford the requisite surface contact between the base and the floor or ground. By providing the base 16 with three legs or feet, it will ensure said base constituting a firm support for the apparatus notwithstanding any slight inclination or unevenness in the surface of the floor or ground.

On the upper end of the cradle frame 1 is formed a projection or pin 28 which is provided to receive one end of a rod or link 29, which serves as a stay between the cradle and the screw-jack. The other end of the rod or link 29 is in the form of a hook 30 which embraces the screw 10. The rod or link 29 is employed when the apparatus is used for lifting the vehicle by the wheels at one side, as represented in Fig. 1.

As is shown in connection with Figs. 2, 3, and 4, means are preferably provided for rigidly connecting the upper end of the screw-jack to the base, foundation or support 16. This connection is employed when the jack is used for lifting the vehicle at both sides of either end, or bodily. Such connection is shown in the form of a stay rod 31 detachably connected at its upper end to the plate 12, and at its lower bifurcated end to one of the legs or feet of the base, foundation or support 16, by means of a pin 32. This stay rod 31 renders the jack a rigid structure and prevents it pivoting about its base 16 on the trunnions 14.

In Figs. 1, 5 and 6 the means for preventing the vehicle and the lifting apparatus from slipping when being used is illustrated. As shown, it includes the wooden or other suitable blocks 33, in one of which eye-bolts 34 are fixed, and through the medium of which eye-bolts the one block is attached to the other by the long hook-bolts 35 engaging with the eye-bolts 34 at one end and passing through the other block 33 and secured thereto by the wing-nuts 36. 37 is a bar or member shaped at the ends hingedly to engage with one of the hook-bolts 35. In the plate 37 a hole 38 is provided for receiving the one end of a coupling rod 39, the other end of which engages in an eye-piece 40 fixed on the flat side of the D-shaped portion 27 of the base 16, as seen in Figs. 1, 2 and 4. This arrangement constitutes a safety retaining or locking means for keeping the wheels at the one side of the vehicle firm on the floor and preventing their shifting or slipping when the vehicle is lifted at the opposite side. The screw-jack and locking blocks, being connected together, operate mutually to prevent outward movement or slip of each other, even if the car be lifted to the fullest possible extent or to the limit of the lifting means, the retaining means being firmly held down on the floor or ground by the weight of the vehicle.

In Figs. 7 and 8 I illustrate a suitable construction of safety stand for supporting the vehicle through the medium of the wheel or wheels after it has been lifted. In this form the stand comprises the tripod or three tubular legs 41, rigidly connected together by means of a triangular band 42, and carrying at their upper ends a plate 43 to the ends of which are welded or otherwise fixed tubular pieces 44 which operate to retain the tyre of the wheel in position between them. 45 are stay plates for additionally connecting the plate 43 to the upper ends of the legs 41, and 46 are flat base plates welded to the lower ends of said legs 41.

In the further construction of stand or support shown in Fig. 9, which is adapted for supporting the vehicle say through the medium of the axle, chassis, running boards, et cetera, the legs 47 are welded or otherwise rigidly connected to and support a vertical pipe or tubular piece 48; 49 being stays for additionally securing the lower end of the pipe or tube 48 to the legs 47, and 50 flat base pieces provided at the bottoms of the legs 47. 51 is the upper portion of the stand, shaped at 52 to take say the axle, chassis, running boards, et cetera, of the vehicle and adapted to telescope into the pipe or tube 48. Holes 53 are provided in the telescopic member for the purpose of receiving a retaining and locking pin 54 to retain the head or upper portion 51 of the stand in any desired extended and supporting position; 55 being a chain for attaching the pin 54 permanently to a lug 56 on the pipe or tube 48.

What I claim is my invention and desire to protect by Letters Patent is:—

1. Apparatus for lifting motor vehicles through the medium of their wheels, comprising a cradle for one of the wheels, a lifting jack to which the cradle is pivotally connected and by which it can be raised and lowered, and means, which are engaged by the wheel at the opposite side of the vehicle, for retaining the lifting jack and cradle in position by preventing the same from slipping outwardly in the lifting operation, said latter means being in the form of a pair of blocks between which the wheel rests, and means detachably connecting said blocks to the base of the lifting jack, as set forth.

2. Apparatus for lifting motor vehicles through the medium of their wheels, comprising a cradle for one of the wheels, a lifting jack to which the cradle is pivotally connected and by which it can be raised and lowered, and means, which are engaged by the wheel at the opposite side of the vehicle, for retaining the lifting jack and cradle in position by preventing the same from slipping outwardly in the lifting operation, said latter means being in the form of a pair of blocks between which the wheel rests, bolts for loosely connecting the blocks together, a plate which is hingedly mounted on one of said bolts, and a coupling rod which at one end engages with said plate and at its other end engages with the base portion of the lifting jack, as set forth.

3. Apparatus for lifting motor vehicles through the medium of their wheels, including a cradle for one of the wheels and a lifting jack to which the cradle is pivotally connected and by which it can be raised and lowered, the cradle comprising a frame of inverted V shape which is placed against the outside of the wheel, a plurality of inwardly directed projections on the lower end of said frame which are adapted to be passed under the wheel and engage with the tyre thereof at some distance above the ground level, adjustable stops on said projections adapted to engage the inner side of the wheel, members attached to the back of the frame, and bearings fixed to said members, and the jack including a main frame, a screw carried by said frame, a nut which is raised and lowered by said screw, said nut being provided with pivots which work in the bearings carried by the member at the back of the cradle frame, bevel gear on the frame for rotating the screw, and a base to which the bottom of the frame which carries the screw is pivotally attached, as set forth.

4. Apparatus for lifting motor vehicles through the medium of their wheels, comprising a cradle for the wheel, and a lifting jack to which the cradle is pivotally connected and by which it can be raised and lowered, said jack being pivotal about its base and having a stay loosely connected at one end to the base and adapted detachably to engage the frame of the jack to render the jack structure rigid, the cradle including a frame to be placed against the outside of the wheel, having inwardly extending lower parts which project beneath the wheel, adjustable stops on said parts adapted to engage the inner side of the wheel, and bearings fixed to said frame for pivotally engaging with the part of the jack which is raised and lowered, as set forth.

5. Apparatus for lifting motor vehicles through the medium of their wheels, including a cradle for one of the wheels and a lifting jack to which the cradle is pivotally connected and by which it can be raised and lowered, the cradle comprising a frame which is placed against the outside of the wheel, a plurality of inwardly directed projections on the lower end of said frame which are adapted to be passed under the wheel and engage with the tyre thereof at some distance above the ground level, adjustable stops on said projections adapted to engage the inner side of the wheel, members attached to the back of the frame, and bearings fixed to said members, and the jack including a main frame, a screw carried by said frame, a nut which is raised and lowered by said screw, said nut being provided with pivots which work in the bearings carried by the member at the back of the cradle frame, bevel gear on the frame for rotating the screw, a base to which the bottom of the frame which carries the screw is pivotally attached, and a stay loosely connected at one end to the frame and adapted detachably to engage the frame of the jack to render the jack structure rigid, as set forth.

In testimony whereof I have signed my name to this specification.

JOSEPH ADOLPH GEORGE KIRSTEN.